(12) United States Patent
Blais-Ouellette (10) Patent No.: US 7,557,990 B2
(45) Date of Patent: Jul. 7, 2009

(54) METHOD AND APPARATUS FOR A BRAGG GRATING TUNABLE FILTER

(75) Inventor: Sebastien Blais-Ouellette, Laval (CA)

(73) Assignee: California Institute of Technology, Pasadena, CA (US)

( * ) Notice: Subject to any disclaimer, the term of this patent is extended or adjusted under 35 U.S.C. 154(b) by 265 days.

(21) Appl. No.: 11/063,241

(22) Filed: Feb. 19, 2005

(65) Prior Publication Data
US 2005/0195484 A1    Sep. 8, 2005

Related U.S. Application Data

(60) Provisional application No. 60/546,634, filed on Feb. 20, 2004.

(51) Int. Cl.
*G02B 5/18* (2006.01)
(52) U.S. Cl. .......................... 359/572; 359/15; 359/569; 385/37
(58) Field of Classification Search ................. 359/572, 359/15; 385/37
See application file for complete search history.

(56) References Cited

U.S. PATENT DOCUMENTS

| | | | |
|---|---|---|---|
| 7,125,632 B2 * | 10/2006 | Volodin et al. ................ | 430/1 |
| 7,199,924 B1 * | 4/2007 | Brown et al. ................ | 359/556 |
| 2003/0007202 A1 | 1/2003 | Moser, et al. | |
| 2003/0179990 A1 | 9/2003 | Weber, et al. | |

FOREIGN PATENT DOCUMENTS

EP        0 545 524 A    6/1993

OTHER PUBLICATIONS

Bland-Hawthorn, J.; Jones, D. Heath, Taurus Tunable Filter: A flexible approach to narrowband imaging, Publications Astronomical Society of Australia, vol. 15, No. 1, p. 44-49 (1998), no month.
Bland-Hawthorn, Joss; Jones, D.H., A Tunable Lyot Filter At Prime Focus: A Method For Tracing Supercluster, Proc. SPIE vol. 3355, p. 855-865 (2001), n month.
Barden, Samuel C.; Arns. James A.; Colburn, Willis S.; Williams, Joel B., Volume-Phase Holographic Gratings and the Efficiency of Three simple Volume-Phase Holographic Gratings, The Publications of the Astronomical Society of the Pacific, vol. 112, Issue 772, pp. 809-820 (2000), no month.
Shopbell, P.L.; Veilleux, S.: Bland-Hawthorn, J., The Very Extended Ionized Nebula around the Quasar MR 2251-178. The Astrophysical Journal, v. 524, p. L83 (1999), no month.

(Continued)

*Primary Examiner*—Joshua L. Pritchett
(74) *Attorney, Agent, or Firm*—Tope-McKay & Associates (57) ABSTRACT

The present invention relates to tunable filters. More specifically, the present invention pertains to a method and apparatus that allows tuning of a wavelength over a large optical band. The disclosed system and method allows an arbitrary wavelength selection of an incoming beam of light. The disclosed system and method may be used in imaging systems like telescopes or microscopes, or for point sources like laser or optical fibers. Further, in the case of optical fibers, it may be used as an add/drop filter.

17 Claims, 6 Drawing Sheets

OTHER PUBLICATIONS

Reuland, Michiel; van Breugel, Wil; Rottgering, Huub: de Vries, Wim; Stanford, S.A.; Dey, Arjun; Lacy, Mark; Bland-Hawthorn, Joss: Dopita, Michael; Miley, George. Giant Lya Nebulae Associated with High-Redshift Radio Galaxies. The Astrophysical Journal, vol. 592, Issue 2, pp. 755-766 (2003), no month.

Stanford, S.A.; Elston, Richard; Eisenhardt, Peter R.; Spinard, Hyron; Stern, Daniel; Dey, Arjun. An IR-Selected Galaxy Cluster at z=1.27. Astronomical Journal v. 114, p. 2232 (1997).

van Dokkum, Pieter G.; Stanford, S.A. A Massive Disk Galaxy at z=1.34. The Astrophysical Journal, vol. 562, Issue 1, pp. L35-L38 (2001), no month.

Steidel, Charles C.; Adelberger, Kurt L.; Dickinson, Mark; Giavalisco, Mauro; Pettini, Max; Kellogg, Melinda. A Large Structure of Galaxies at Redshift Z approximately 3 and Its Cosmological Implications. Astrophysical Journal v. 492, p. 428 (1998), no month.

Fan, Xiaohui; et al. A Survey of z>5.8 Quasars in the Sloan Digital Sky Survey. I. Discovery of Three New Quasars and the Spatial Density of Luminous Quasars at z-6. The Astronomical Journal, vol. 122, Issue 6, pp. 2833-2849 (2001), no month.

Van Breuget, Willem J.; Reuland, Michiel A.; de Vries, Willem H.,: Stanford, Adam; Dey, Arjun:Kurk, Jaron; Venemans, Bram: Roetigering Huub J.A.; Miley George; De Breuck, Carlos: Dopita, Mike: Sutherland, Ralph; Bland-Hawthorn, Jonathan. BRIGHT lights, BIG city: high redshift radio galaxies, giant ly-a halos, and proto-clusters.Discoveries and Research Prospects from 6- to 10-Meter-Class Telescopes II. Edited by Guhathakurta, Puragra. Proceedings of the SPIE, vol. 4834, pp. 24-34 (2003), no month.

Cuby, J.-G.; Le Fevre, O.; McCracken, H. ; Cuillandre, J.-C.; Magnier, E. ; Meneux, B. Discovery of a z=6.17 galaxy from CFHT and VLT observations. Astronomy and Astrophysics, v. 405, p. L19-L22 (2003), no month.

Rhoads, James E. ; Malhotra, Sangeeta; Dey, Arjun; Stem, Daniel; Spinard, Hryon; Jannuzi, Buell T.; Dawson, Steve; Brown, Michael J. I.; Landes, Emily. Spectroscopic Confirmation of Three Redshift z-5.7 Lya Emitters from the Large-Area Lyman Alpha Survey. The Astronomical Journal, vol. 125, Issue 3, pp. 1006-1013 (2003), no month.

S. Blais-Ouellette, et al., "Double Bragg Grating Tunable Filter" Proceedings of the SPIE, vol. 5492, Sep. 2004, pp. 779-786, XP002333159, Bellingham.

Arns, et al., "Volume phase gratings for spectroscopy, ultrafast laser compressors, and wavelength division multiplexing" Proceedings of the SPIE, vol. 3779, Jul. 21, 1999, pp. 313-323, XP002333160.

Pallister et al. "Raman Imaging System with Dual Holographic Grating Tunable Filter", Applied Spectroscopy, vol. 48, No. 8, 1994.

Office Action for application No. 200580012321.2; "Method and Apparatus for a Bragg Grating Tunable Filter;" Mar. 28, 2008, pp. 1-9.

* cited by examiner

METHOD AND APPARATUS FOR A BRAGG GRATING TUNABLE FILTER

CROSS-REFERENCE TO RELEATED APPLICATIONS

The present application claims the benefit of priority of U.S. Provisional Patent Application No. 60/546,634, filed Feb. 20, 2004, and entitled "Double Bragg Grating Tunable Filter."

BACKGROUND OF THE INVENTION (1) Field of the Invention

The present invention relates to tunable filters. More specifically, the present invention pertains to a method and apparatus that allows tuning of a filter over a large optical band.

Narrow-band imaging is an important ingredient of observational sciences such as astronomy, remote sensing, Raman imaging, and molecular analysis. The capacity to isolate a known spectral feature allows a deep view of the universe by removing unwanted photons from the background and from the source of interest itself. Faint high redshift clusters of galaxies, emission line comparisons across extended objects, and Raman microscopic imaging are just a few examples of the compelling research relying on band-limiting filters. In most cases, fixed-interference filters are used, which often limit the observations to a few spectral features. Observing capabilities are greatly enhanced when a tunable filter is employed in place of the fixed filters.

(2) Description of Related Art

Currently available tunable filter technologies are mostly based on low-order Fabry-Perot etalons, such as those described in J. Bland-Hawthorn and D. Jones, Taurus Tunable Filter: A flexible approach to narrowband imaging, Publications Astronomical Society of Australia, vol. 15, no. 1, p. 44-49 (1998). Other available tunable filter technologies include acousto-optics and Lyot filters, such as those discussed in Joss Bland-Hawthorn and D. H. Jones, A Tunable Lyot Filter at Prime Focus: A Method for Tracing Supercluster, Proceedings SPIE, vol. 3355, p. 855-65 (2001). One drawback of the Fabry-Perot filters is that they are restricted to very narrow bandwidth, and average transmissivity. They transmit multiple inference orders and thus necessitate intermediate band blocking filters. Lyot and acousto-optics filters are promising for wide field imagers, but work in polarized light. Therefore, the Lyot and acousto-optic filters intrinsically reject at least half of the light or require two detector planes. Thus, they have a low throughput, besides being optically very complex. What is needed is a tunable filter over an optical band, with increased efficiency, without periodic orders, and without additional efficiency losses.

Although work has been done in this area, one drawback is that the systems proposed are optically complex, limited in their tunablity and efficiency. What is needed is a simpler system with an adjustable pass band and greater efficiency.

BRIEF SUMMARY OF THE INVENTION

The present invention provides a system and a method that overcomes the aforementioned limitations and fills the aforementioned needs by providing a method and apparatus for a tunable filter.

In one aspect, the present invention provides a method of imaging comprising acts of: collimating a beam; dispersing the collimated beam with a first volume Bragg grating; and recombining the dispersed beam with a second volume Bragg grating.

In another aspect, the present invention provides a tunable filter comprising: a collimating lens for receiving beam and outputting a collimated beam; a first reflective volume Bragg grating for receiving the collimated beam and outputting a dispersed beam, the first reflective volume Bragg grating being positioned at an angle; a second reflective volume Bragg grating positioned substantially in parallel with the first reflective volume Bragg grating, at a distance from the first reflective volume Bragg grating, and at an angle, the second reflective volume Bragg grating for receiving the dispersed beam and outputting a recombined beam, wherein the filter is tuned by changing the angle of the of the first reflective volume Bragg grating, the angle of the second reflective volume Bragg grating, and the distance from the first reflective volume Bragg grating.

In a further aspect, the tunable filter further comprises focusing optics positioned to receive the recombined beam from the second reflective volume Bragg grating.

In yet a further aspect, the volume Bragg gratings are made from the group consisting of: diochromated gelatin, holographic doped class, and holographic polymer.

In another aspect, the present invention provides a method for tuning a filter over a large optical band comprising acts of: setting a first reflective volume Bragg grating at an angle; and setting a second reflective volume Bragg grating substantially parallel to the first reflective volume Bragg grating, wherein the second reflective volume Bragg grating is also set an angle.

In yet another aspect, the present invention provides a tunable filter comprising: a collimator for receiving beam and outputting a collimated beam; a first volume Bragg grating portion for receiving the collimated beam and outputting a dispersed beam having a dispersion orientation, the first reflective volume Bragg grating being positioned at an angle; a reflection system located at a position for receiving the dispersed beam and outputting a reflected dispersed beam, wherein the reflected dispersed beam has a dispersion orientation different from the dispersed beam; a second volume Bragg grating portion for receiving the reflected dispersed beam and outputting a recombined beam, the second volume Bragg grating portion being positioned at an angle, wherein the filter is tuned by changing the angles of the of the first and second volume Bragg gratings and the position of the reflection system.

In a further aspect, the first volume Bragg grating and the second volume Bragg grating are transmission volume Bragg gratings.

In yet a further aspect, the first volume Bragg grating and the second volume Bragg grating are reflective volume Bragg gratings.

In another further aspect, the tunable filter further comprises focusing optics positioned to receive the recombined beam.

In a further aspect, the volume Bragg gratings are made from the group consisting of: diochromated gelatin, holographic doped class, and holographic polymer.

In yet another further aspect, the reflection system is a cube-corner.

In another aspect, the present invention provides a method for imaging using a tunable filter over a large optical band comprising acts of: setting a first volume Bragg grating at an angle; setting a reflection system at a position from the first volume Bragg grating; and setting a second volume Bragg grating at an angle, wherein a beam is dispersed by the first volume Bragg grating, reflected by reflection system, and recombined by the second volume Bragg grating.

In a further aspect, the method further comprises an act of tuning the tunable filter, wherein the act of tuning comprises acts of: changing the angle of the first volume Bragg grating; changing the position of the reflection system; and changing the angle of the second volume Bragg grating.

In another aspect, the present invention provides a butterfly tunable filter comprising: a collimating lens for receiving a beam and outputting a collimated beam; a first volume Bragg grating for receiving the collimated beam and outputting a dispersed beam; a mirror for receiving the dispersed beam and reversing a direction of the dispersed beam, outputting a reversed dispersed beam; a second volume Bragg grating for receiving the reversed dispersed beam and outputting a recombined beam.

In a further aspect, the butterfly tunable filter further comprises a blocker for blocking the $0^{th}$ order of the dispersed beam.

In yet a further aspect, the butterfly tunable filter comprises focusing optics positioned to receive the recombined beam.

In a further aspect, the volume Bragg gratings are made from the group consisting of: diochromated gelatin, holographic doped class, and holographic polymer.

In yet another aspect, the present invention provides a method for imaging using a butterfly filter over a large optical band comprising acts of: setting a first volume Bragg grating at an angle; setting a mirror at a first position relative to the first grating; and setting a second volume Bragg grating at an angle and first position relative to the mirror, wherein a beam is dispersed by the first volume Bragg grating, reflected by the mirror, and recombined by the second volume Bragg grating.

In a further aspect, the method of imaging further comprises an act of tuning the butterfly filter, wherein the act of tuning comprises acts of: changing the angle of the first volume Bragg grating; changing the position of the mirror relative to the first volume Bragg grating; and changing the angle of the second volume Bragg grating relative to the mirror.

BRIEF DESCRIPTION OF THE DRAWNGS

The objects, features and advantages of the present invention will be apparent from the following detailed descriptions of the preferred aspects of the invention in conjunction with reference to the following drawings, where.

DETAILED DESCRIPTION

The present invention relates to the field of tunable filters. More specifically, the present invention pertains to a method and apparatus that allows tuning of a wavelength over a large optical band. The following description, taken in conjunction with the referenced drawings, is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore, it should be noted that, unless explicitly stated otherwise, the figures included herein are illustrated diagrammatically and without any specific scale, as they are provided as qualitative illustrations of the concept of the present invention.

One skilled in the art will appreciate that the scope of the terms is intended to be construed with reference to this disclosure as a whole and with respect to the claims below. In order to provide a working frame of reference, a brief introduction is provided in the form of a narrative description of the present invention to give a conceptual understanding prior to developing the specific details. The introduction is followed by a detailed description of the elements is provided in order to enable the reader to make and use the various embodiments of the invention without involving extensive experimentation.

(1) Introduction

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

(2) System Overview

The system and method is capable of selecting one optical band from a plurality of optical bands, with efficiency that can reach at least 80%. The disclosed system and method allows an arbitrary wavelength selection of an incoming beam of light. The disclosed system and method may be used in imaging systems like telescopes or microscopes, or for point sources like laser or optical fibers. Further, in the case of optical fibers, it may be used as an add/drop filter.

(3) Parallel Dual-Grating System

Figure 1A:
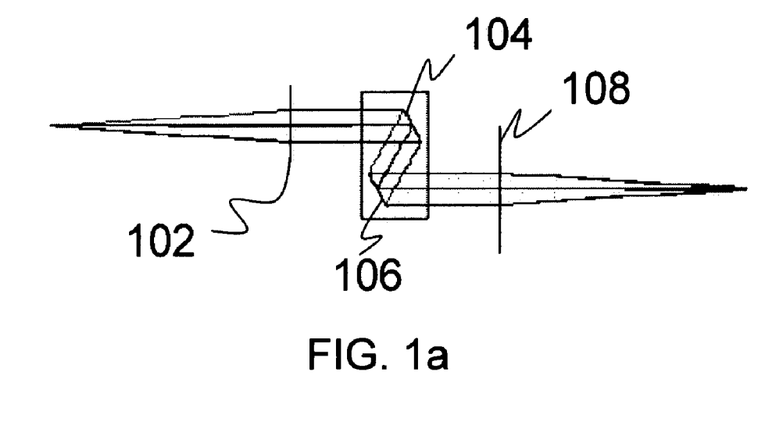
FIGS. 1a and 1b depict one embodiment of a the tunable filter comprising two parallel VPH gratings.

In one embodiment, the tunable filter comprises two parallel volume phase holographic (VPH) Bragg gratings used in a dispersion-recombination configuration. FIG. 1a depicts one embodiment of a tunable filter. The system comprises a collimating lens 102, a first reflective grating 104, a second reflective grating 106 substantially in parallel with the first reflective grating 104, and an optional focusing lens 108. The first reflective grating 104 disperses the collimated light that satisfies the Bragg condition. The second grating 106 recombines the beam which may then be re-imaged by the optional focusing lens 108 onto a detector (not shown). In FIG. 1a, which is just one example of the parallel dual-grating system, the grating angle is depicted as approximately 30 degrees, the pass band is centered on 500 nanometers for a 2000 lines/millimeter volume phase holographic (VPH) grating.

Figure 1B:
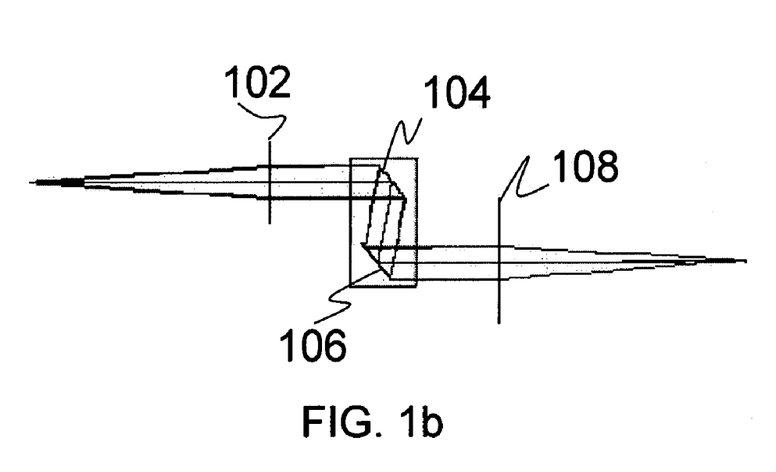

FIG. 1b depicts the tunable filter shown in FIG. 11 tuned to select a second wavelength. The system comprises a collimating lens 102, a first reflective grating 104, a second reflective grating 106 in parallel with the first reflective grating 104, and an optional focusing lens 108. In this embodiment, the grating angle is 17.5 degrees, the pass band is centered on a 300 nanometer for a 2000 lines/millimeter VPH grating.

The passband of the tunable filters in FIGS. 1a and 1b is determined by the first order grating efficiency curve, which changes in wavelength according to the angle of incidence. The filter can be tuned over ranges of wavelengths according to the angle of incidence. A VPH grating comprises of a volume in which the index of refraction varies periodically (i.e., the first reflective grating 104 and the second reflective grating 106). The orientation of the modulation structure with respect to incoming light determines whether the grating is reflective or transmissive. In the embodiments shown in FIGS. 1a and 1b, the VPH grating is reflective.

Using the second grating 106 (shown in FIG. 1a), it is possible to recombine, or "undisperse," the light coming from the first grating 104. An image can be reconstructed as long as the gratings are parallel and have the same line frequency, or more generally, as long as their angular dispersions are identical as illustrated in FIGS. 1a and 1b. Only light, whose wavelength satisfies the Bragg condition, is diffracted. It is then possible to adjust the grating angle, effectively tuning the filter central wavelength.

(4) Reflection Grating with Cube-Corner Tunable Filter

One aspect of the embodiment shown in FIGS. 1a and 1b, is that the output of the system varies as different wavelengths are selected. Thus, the optional camera or detector must be moved as the different wavelengths are selected.

Figures 2A, 2B:
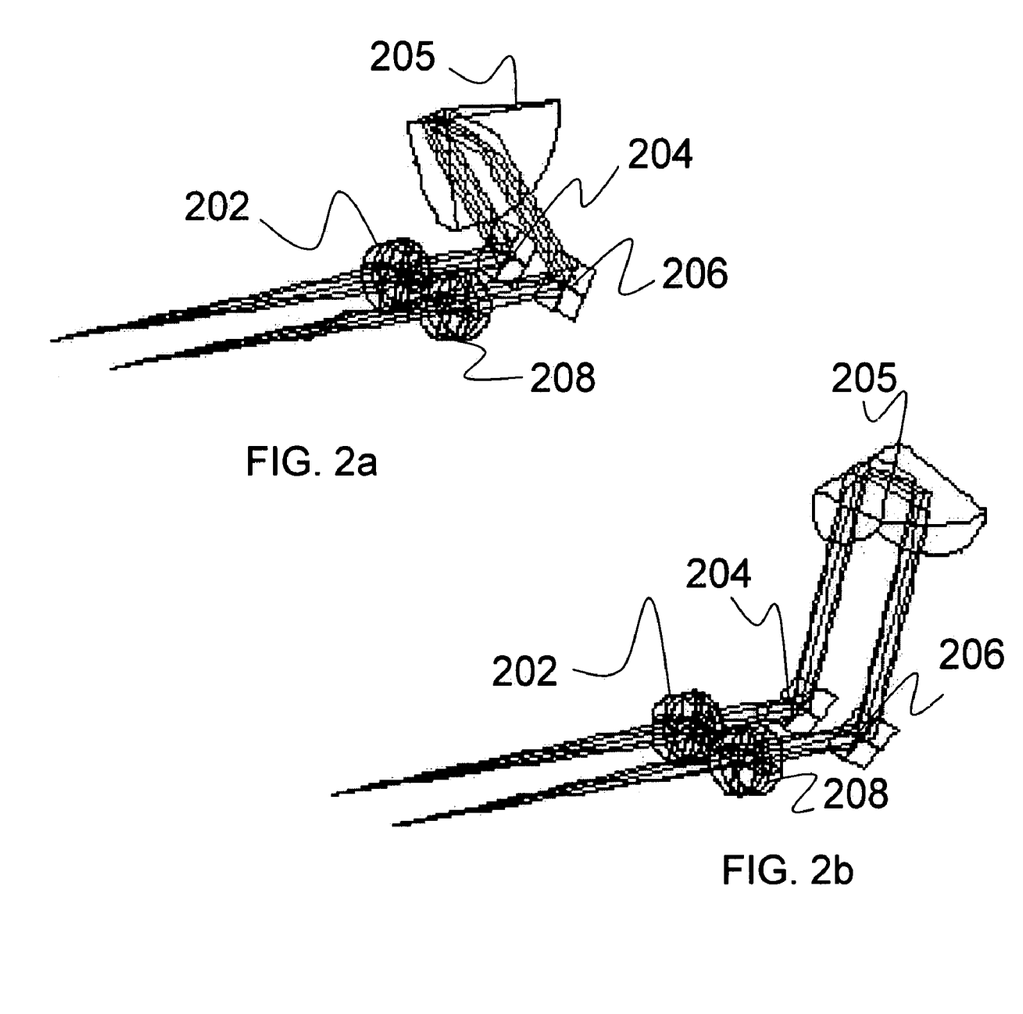
FIGS. 2a and 2b depict one embodiment of the tunable filter comprising reflection gratings with a cube-corner.

Another embodiment of the tunable filter is shown in FIGS. 2a and 2b. In this embodiment the wavelength is tuned by changing the grating angle and changing the cube-corner by twice this angle about the grating axis. In this embodiment, the optional camera or detector does not have to be moved as the different wavelengths are selected. As shown in FIG. 2a, this embodiment comprises a collimator 202, a first reflection grating 204, a cube-corner 205, a second reflection grating 206, and optional focusing optics 208. One skilled in the art will appreciate that the cube-corner may be replaced by other optical systems. More generally, the cube-corner can be replaced by a reflection system that reverses the dispersion orientation in order for the second grating to compensate for the dispersion created by the first grating and recombine the beam for each wavelength. One skilled in the art will also appreciate that although the gratings 204 and 206 are shown in FIGS. 2a and 2b as separate gratings, the gratings could also be different portions of the same grating.

FIG. 2b depicts the tunable filter shown in FIG. 2a tuned to select a second wavelength. The system comprises a collimator 202, a first reflection grating 204, a cube-corner 205, a second reflection grating 206, and optional focusing optics 208. One advantage of this design is that the input and outputs are fixed relative to each other.

(5) Transmission Grating with Cube-Corner Tunable Filter

Figure 3A:
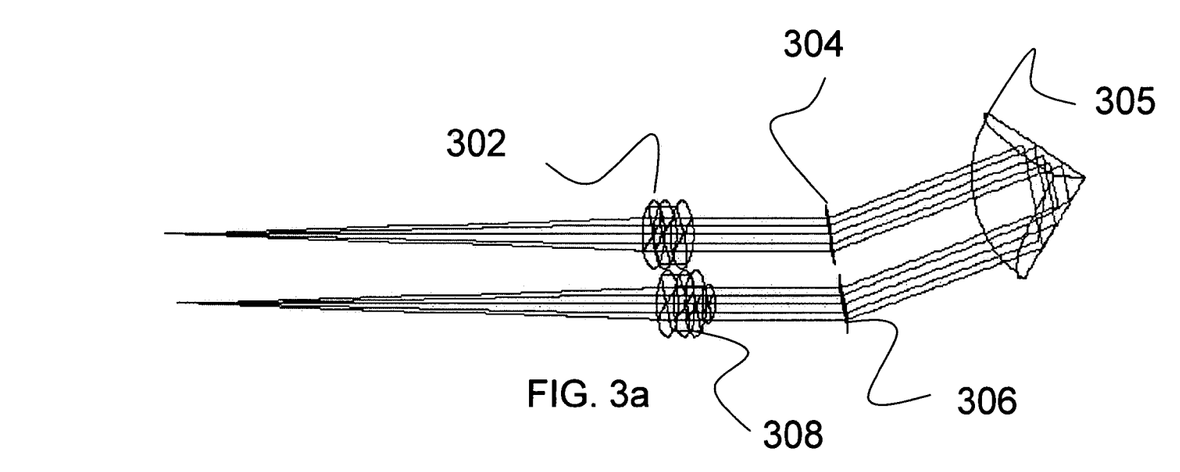
FIGS. 3a and 3b depict one embodiment of the tunable filter comprising transmission gratings with cube-corner.
Figure 3B:
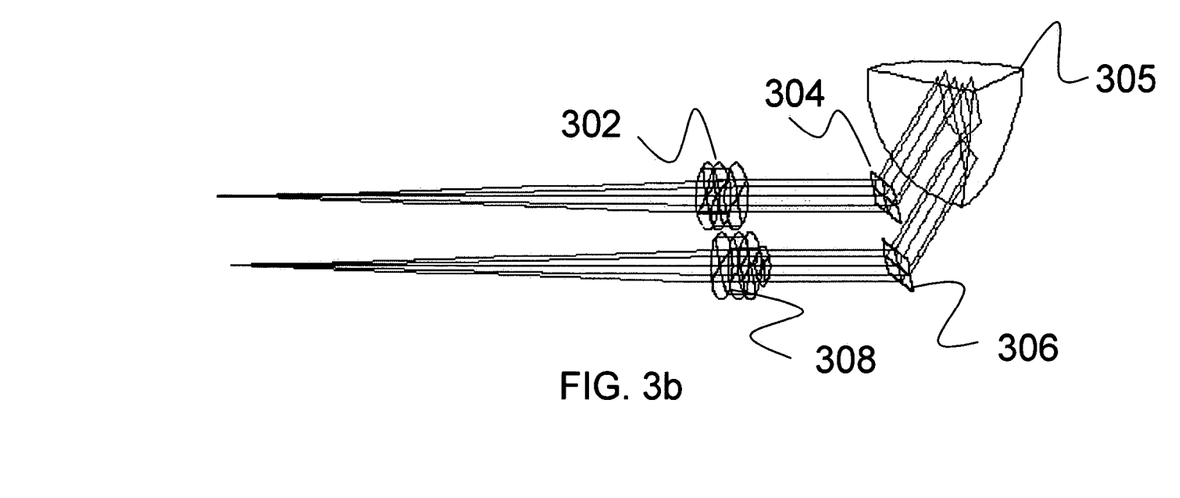

Another embodiment of the tunable filter is shown in FIGS. 3a and 3b. In this embodiment, the wavelength is tuned by changing the grating angle-and changing the cube-corner by twice this angle about the grating axis. As shown in FIG. 3a, this embodiment comprises a collimator 302, a first transmission grating 304, a cube-corner 305, a second transmission grating 306, and optional focusing optics 308. One skilled in the art will appreciate that the cube-corner may be replaced by other optical systems. More generally, the cube-corner can be replaced by a reflection system that reverses the dispersion orientation in order for the second grating to compensate for the dispersion created by the first grating and recombine the beam for each wavelength. One skilled in the art will also appreciate that although the gratings 304 and 306 are shown in FIGS. 3a and 3b as separate gratings, the gratings could also be different portions of the same grating.

FIG. 3b depicts the tunable filter, shown in FIG. 3a, tuned to select a second wavelength. The system comprises a collimator 302, a first transmission grating 304, a cube-corner 305, a second transmission grating 306, and optional focusing optics 308.

(6) Butterfly Design Tunable Filter

Figure 4A:
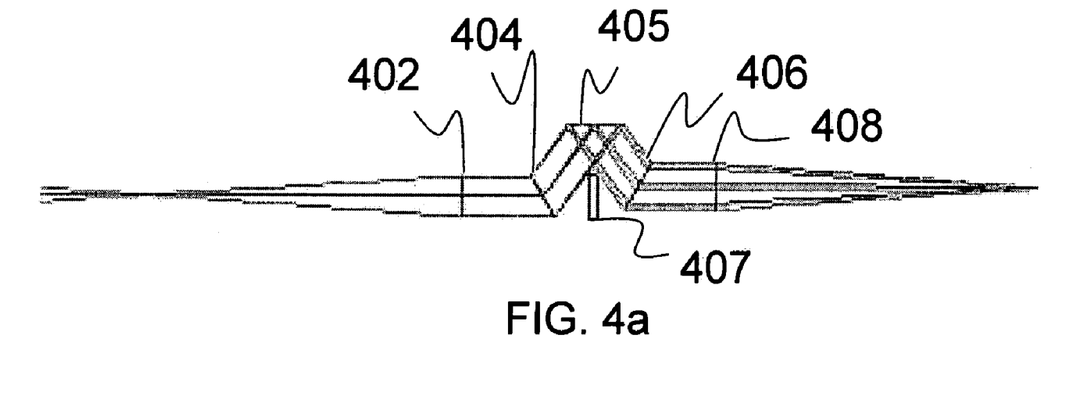
FIGS. 4a and 4b depict one embodiment of the tunable filter in a butterfly design.

FIG. 4a depicts one embodiment of the butterfly design. The system comprises a collimating lens 402, a first grating 404, a mirror 405, a second grating 406, a blocker 407, and an optional focusing lens 408. The mirror 405 reflects the beam generated by the first grating 404, and its height is adjusted to fix the path length. A blocker, or fold mirror, 407 is used to block the $0^{th}$ order (i.e., undefeated) beam.

Figure 4B:
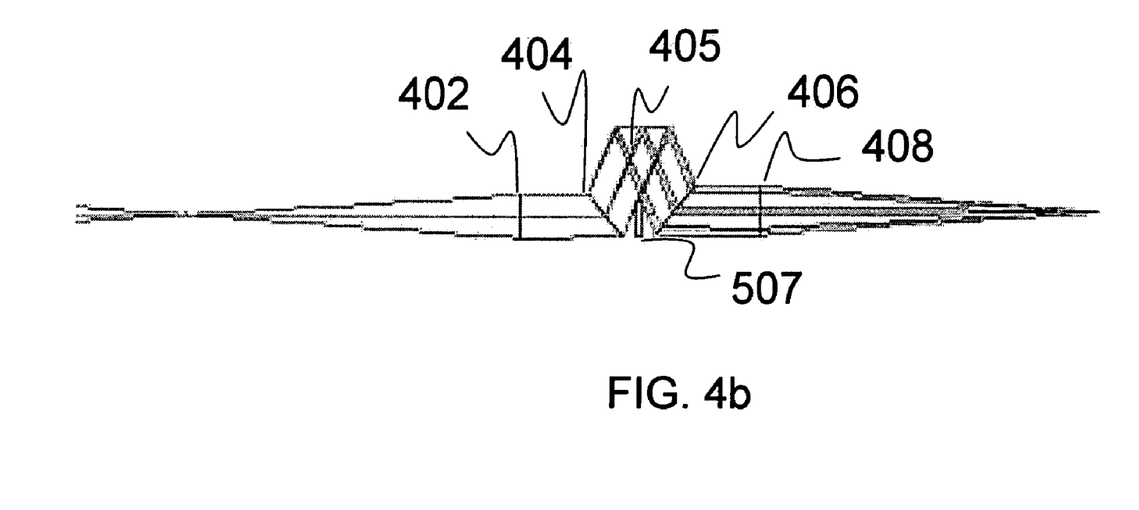

FIG. 4b depicts the system, shown in FIG. 4a, tuned to a different wavelength. As shown by comparing FIG. 4a to FIG. 4b, the wavelength is tuned by symmetrically changing the angles of the gratings and moving the mirror relative to the gratings. One benefit of this design is that the optional camera or detector is always in the axis of the output beam. In this design, wavelength is adjusted using a mechanism that keeps both gratings 404 and 406 at equal, but opposite angles, from the incoming beam. One skilled in the art will appreciate that the blocker 407 could be replaced with collecting optics for the unaffected beam.

(7) Filter Details

The needed key technologies to build these devices are readily available: VPHs, also called Volume Bragg Gratings (VBG), can be built with high accuracy and repeatability; their size can be sufficient to allow large field-of-view; and the level of accuracy needed for the gratings micro-positioning is routinely achieved in existing instruments. One example of a grating is the SLR series from Ondax Inc. (Monrovia, Calif.).

There are many advantages to all the embodiments shown in FIGS. 1-4, when used with world-class astronomical facilities, such as the 5 meter Hale Telescope at Palomar Observatory and the two 10 meter Keck telescopes. For instance, the absence of a wavelength gradient across the non-dispersion axis allows a much faster beam along the axis, using cylindrical optics. The sky coverage is then greatly increased, especially if using a long rectangular detector. Moreover, a detector with multiple readout units along the short edge of the detector would allow a deep efficient multiple narrow band survey.

The gratings (i.e., 104 and 106 in FIGS. 1a and 1b, 204 and 206 in FIGS. 2a and 2b, 304 and 306 in FIGS. 3a and 3b, and 404 and 406 in FIGS. 4a and 4b, can be made of dichromated gelatin (DCG) for a broad passband (i.e., greater than 20 nanometers) or from holographic doped glass or polymer for narrower passbands. One skilled in the art will appreciate that an add/drop filter can be built with the same principle. One skilled in the art will appreciate that the unaffected beam can be collected via collecting optics.

In one embodiment, off-axis angles and collimator size are balanced. One skilled in the art will appreciate that the specific choice depends on the acceptable wavelength gradient across the field. For large wavelength-span survey modes, such gradients are not a handicap; thus a compact instrument can be designed. On the other hand, for targeted observations, one would want a quasi-monochromatic field, implying a long focal length and, thus, a large pupil system. Interestingly, current technology allows building a very large format VPH (up to half a meter even for high index modulation). Such large pupil instruments could allow a low gradient over a reasonable field, even for a 10 meter class telescope such as Keck in Hawaii. It is also important to remember that the gradient is in the dispersion axis only. A very large field could be obtained with a rectangular detector, with its short axis aligned to the dispersion direction.

In setting up the system proper parallelism of the gratings should be maintained while varying the angles over tens of degrees. Or in the case of the butterfly design, the gratings need to be at opposite angles, i.e., 30 degrees and −30 degrees. In seeing limited cases, parallelism should be maintained to less than a tenth of a degree. Such precision can be obtained using current opto-mechanical technologies. Additionally, in the case of the parallel grating design, the optional camera should be mobile along the dispersion axis to follow the second grating when the angle is varied.

(8) Performance

Figure 5:
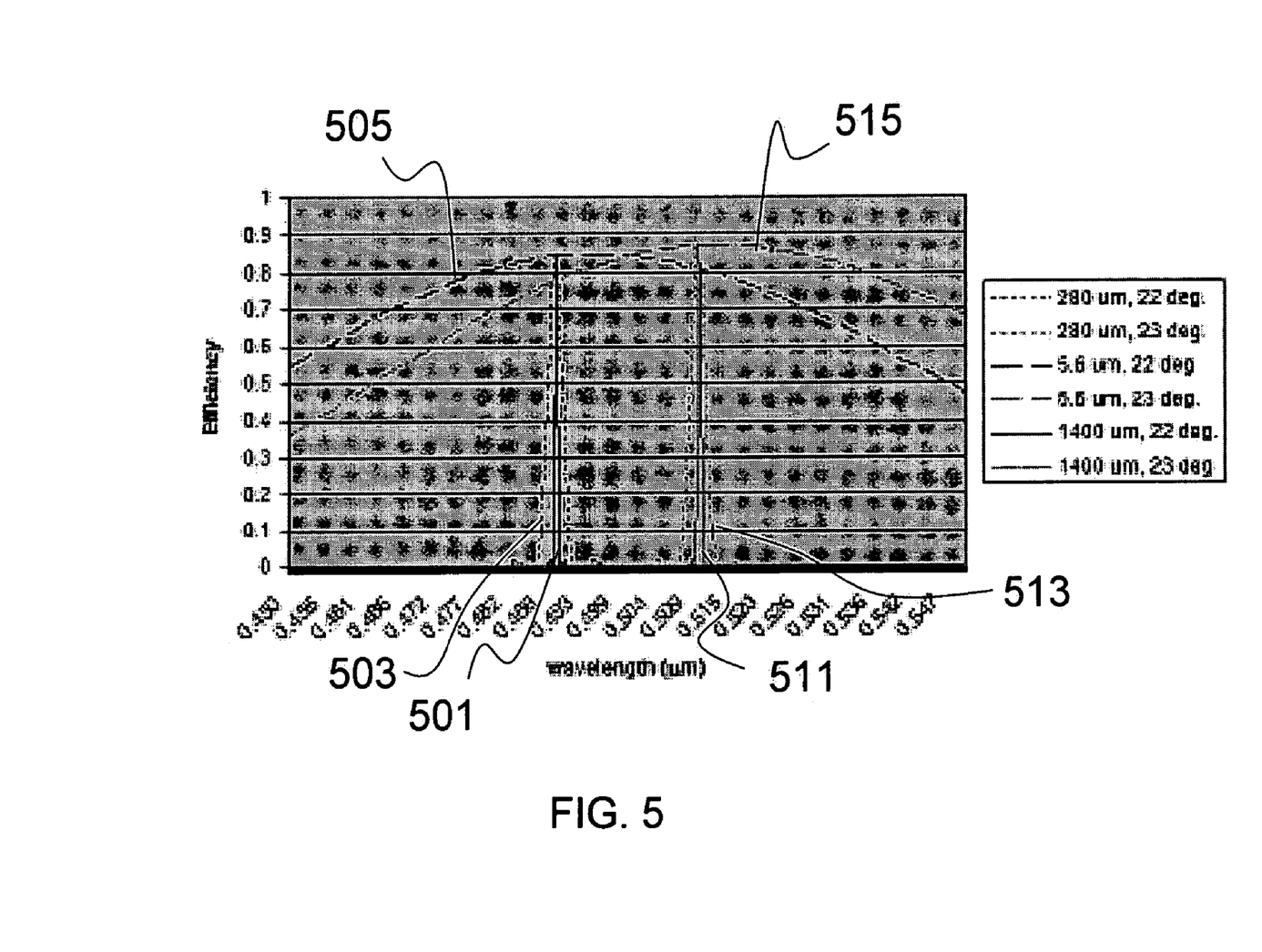
FIG. 5 is a graph of efficiency curves for three different pairs of VPH gratings.

More rigorous simulations, confirm the possibility of obtaining bandwidths between 0.1 nanometers (nm) and 200 nm, but fringing starts to appear for high grating thicknesses (narrow bandwitdth). This may not be a problem if proper apodization is applied to the index modulation pattern, although this may impact efficiency somewhat. FIG. 5 is a graph of efficiency curves for three different pairs of VPH gratings, having thicknesses of 1400 micrometers (μm), 280 μm, and 5.6 μm. Each grating pair is optimized for a wavelength of 0.5 nanometers (nm) at 22.5 degrees (ν=1530/mm). Curve 501 depicts the efficiency versus wavelength of the 1400 μm thick gating pair having a bandwidth of 0.5 nm and being angled at 22 degrees. Curve 503 depicts the efficiency versus wavelength of the 280 μm thick grating pair having a bandwidth of 2.5 nm being angled at 22 degrees. Curve 505 depicts the efficiency versus wavelength of the 5.6 μm grating pair having a bandwidth of 112 nm and being angled at 22 degrees. Curve 511 depicts the efficiency versus wavelength of the 1400 μm thick gating pair having a bandwidth of 0.5 nm and being angled at 23 degrees. Curve 513 depicts the efficiency versus wavelength of the 280 μm thick grating pair having a bandwidth of 2.5 nm and being angled at 23 degrees. Curve 515 depicts the efficiency versus wavelength of the 5.6 μm grating pair having a bandwidth of 112 nm and being angled at 23 degrees.

Figure 6:
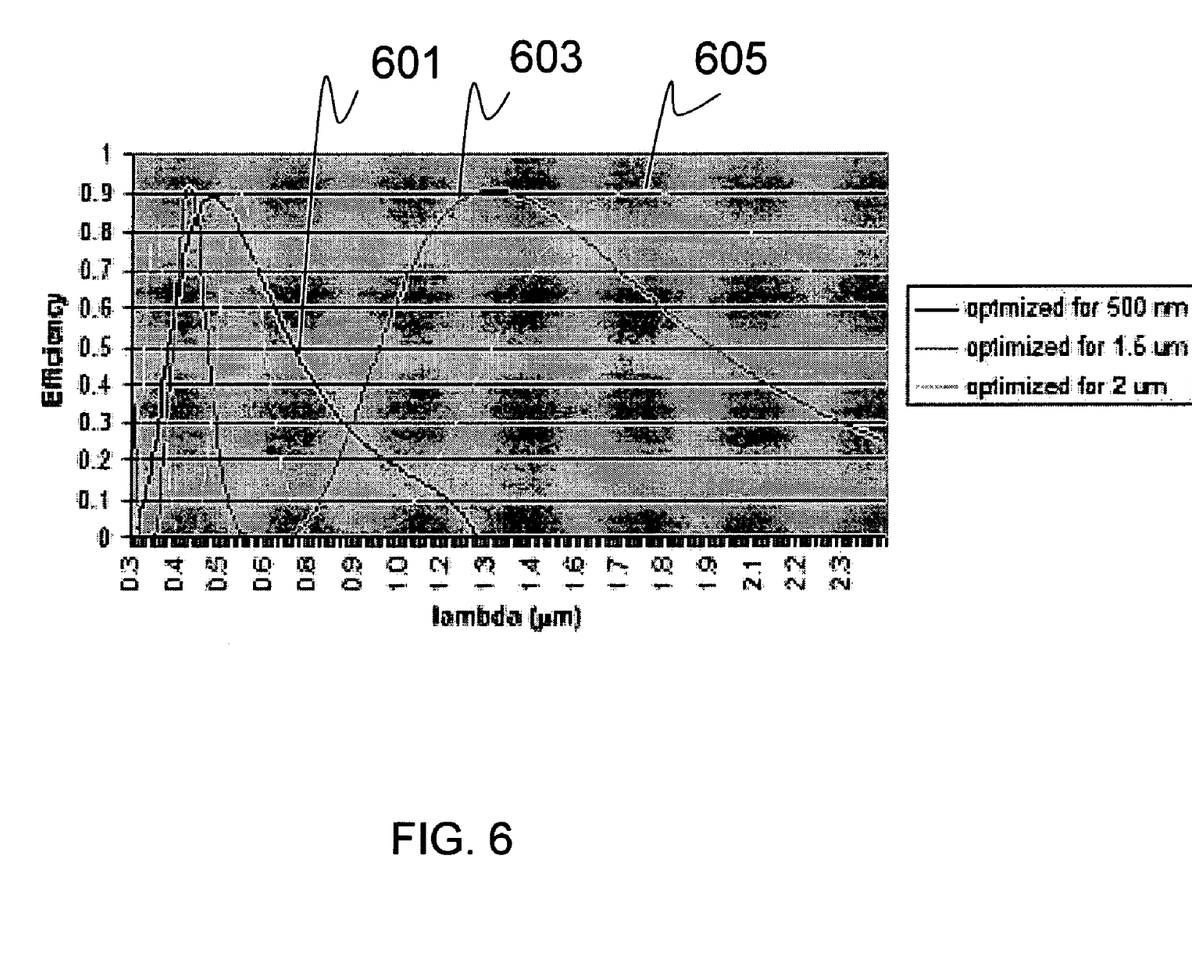
FIG. 6 depicts the peak diffracted energy efficiencies for three gratings.

It is possible to optimize the peak efficiency to any desired wavelength region by adjusting thicknesses and modulation schemes as shown in FIG. 6. FIG. 6 depicts the peak diffracted energy efficiencies for three gratings optimized for wavelengths of 0.5, 1.6 and 2 μm. Curve 601 depicts the diffracted energy efficiencies for the grating optimized for the wavelength of 500 nm. Curve 603 depicts the diffracted energy efficiencies for the grating optimized for the wavelength of 1.6 μm. Curve 605 depicts the diffracted energy for efficiencies for the grating optimized for the wavelength of 2 μm. The graph shows each filter is tunable from 350 nm to 800 nm with efficiency above 50%.

It is possible to adjust the bandwidth by putting an angle between the two gratings. For imaging embodiments, the gating period should be adjusted so that the dispersion is fully compensated. One skilled in the art will appreciate from this example that the design parameter space is vast and trade-offs complex and numerous. Thus, depending on the application different design parameters will be utilized.

(8) Applications

One skilled in the art will appreciate that the range of scientific applications is wide. Many current observations made with conventional interferences filters will be facilitated by the availability of a simple, versatile and efficient tunable filter. Rather than enumerating all such science cases, the applications listed below focus on science projects that are reliant on a tunable filter.

The disclosed tunable filter can be used in the field of wavelength scanning. A tunable filter can be turned into a powerful imaging spectrometer if a wavelength scanning mechanism is provided. The double Bragg grating tunable filter can take full advantage of grating angle scanning and provides an imaging spectrometer that can deliver a spectrum for each imaging pixel.

Such an efficient and versatile imaging spectrograph can lead to a plethora of instrument concepts and applications. Astronomical instruments can be designed to have both a very narrow band for scanning imaging spectrometry, and a narrow to intermediate band for deep narrow-band imaging at arbitrary wavelengths. Similar devices can be designed for earth observation and remote sensing where a fast-scanning narrow-band imager is especially well-adapted to the high level of light. This capacity to reject out-of-band light is a significant advantage over Fourier transform spectrographs, even more so, considering that it can cover all the visible spectrum in addition to the near-infrared.

Microscopy is another natural field of application for the double Bragg grating tunable filter. The device can be tuned to provide images over a set of fluorescence lines where normally this requires imaging through a set of fixed narrow-band filters. When new fluorescent labels are developed, a new filter need not be purchased, but the double Bragg grating tunable filter only needs to be moved to a new position.

As previously mentioned in the discussion of the prior art, to fully exploit emission-line imaging as a cosmological tool, large field-of-view tunable filters are needed. The filters proposed can be designed to posses a very large quasi-chromatic field-of-view. Indeed, contrarily to other types of filters, there is no central wavelength to shift in the non-dispersion axis. Moreover, spectral and spatial scanning can be used to remove the gradient in the other axis.

It is also clear that the selection of emission-line objects provides only partial insight into the galaxy populations and kinematics of proto-clusters, and obtaining spectroscopic absorption line redshifts of faint galaxies will be very difficult. The most powerful observational tool here would again be a tunable filter with medium-sized (few 10 nm wide) bandpasses so that accurate photometric redshift measurements can be made. The proposed double VPH tunable filter is perfectly matched to the task. Further, the proposed filters can be used to detect primeval galaxies.

In addition, a truly efficient and wide-field tunable filter would allow the detection of deep primeval galaxies at z=5 and beyond by providing scan regions of the sky at arbitrary redshift, increasing the potential candidates by an enormous factor. No other device can achieve the expected 75% average throughput, full optical band tunability, and a decent field-of-view. Bandwidth can moreover be design to match the application, yielding the most versatile imaging device.

For these projects and many others, a Bragg grating tunable filter provides a substantial increase in detection sensitivity by its very high efficiency and its arbitrary large passband, enabling scientific discoveries of more distant objects and of more statistically complete samples. One skilled in the art will appreciate additional applications will follow as well, as is being discovered by other tunable filter projects.

(10) Advantages

The Bragg grating tunable filter possesses some significant advantages over an etalon-based tunable filter. For example, a Bragg grating tunable filter's efficiency approaches approximately 90%. Another advantage is the central wavelength shift across the filed (due to angular dependence) is in one axis only. Finally, there are no periodic orders to filter out.

The Bragg grating tunable filter also possesses some significant advantages over an imaging Fourier Transform Spectrograph. It rejects out-of-band light, increasing signal-to-noise ratio for high-background environment. Also, it is insensitive to spectral features outside the observed wavelength.

What is claimed is:

1. A tunable filter comprising:
    a collimating lens for receiving beam and outputting a collimated beam;
    a first reflective volume Bragg grating for receiving the collimated beam and outputting a dispersed beam; and
    a second reflective volume Bragg grating positioned substantially in parallel with the first reflective volume Bragg grating, at a distance from the first reflective volume Bragg grating, the second reflective volume Bragg grating for receiving the dispersed beam and outputting a recombined beam,
    wherein the filter is tuned by changing an angle of the of the first reflective volume Bragg grating, an angle of the second reflective volume Bragg grating, and the distance from the first reflective volume Bragg grating.

2. The tunable filter of claim 1 further comprising focusing optics positioned to receive the recombined beam from the second reflective volume Bragg grating.

3. The tunable filter of claim 1, wherein the volume Bragg gratings are made from a group consisting of: diochromated gelatin, holographic doped class, and holographic polymer.

4. A tunable filter comprising:
    a collimator for receiving beam and outputting a collimated beam;
    a first volume Bragg grating portion for receiving the collimated beam and outputting a dispersed beam having a dispersion orientation;
    a reflection system located at a position for receiving the dispersed beam and outputting a reflected dispersed beam, wherein the reflected dispersed beam has a dispersion orientation different from the dispersed beam; and
    a second volume Bragg grating portion for receiving the reflected dispersed beam and outputting a recombined beam,
    wherein the filter is tuned by changing angles of the of the first and second volume Bragg gratings and the position of the reflection system.

5. The tunable filter of claim 4, wherein the first volume Bragg grating and the second volume Bragg grating are transmission volume Bragg gratings.

6. The tunable filter of claim 4, wherein the first volume Bragg grating and the second volume Bragg grating are reflective volume Bragg gratings.

7. The tunable filter of claim 4 further comprising focusing optics positioned to receive the recombined beam.

8. The tunable filter of claim 4, wherein the volume Bragg gratings are made from a group consisting of: diochromated gelatin, holographic doped class, and holographic polymer.

9. The tunable filter of claim 4, wherein the reflection system is a cube-corner.

10. A method for imaging using a tunable filter over a optical band comprising acts of:
    setting a first volume Bragg grating;
    setting a reflection system at a position from the first volume Bragg grating; and
    setting a second volume Bragg grating,
    wherein a beam is dispersed by the first volume Bragg grating, reflected by reflection system, and recombined by the second volume Bragg grating.

11. The method of claim 10, further comprising an act of tuning the tunable filter, wherein the act of tuning comprises acts of:
    changing an angle of the first volume Bragg grating;
    changing the position of the reflection system; and
    changing an angle of the second volume Bragg grating.

12. A butterfly tunable filter comprising:
    a collimating lens for receiving a beam and outputting a collimated beam;
    a first volume Bragg grating for receiving the collimated beam and outputting a dispersed beam;
    a mirror for receiving the dispersed beam and reversing a direction of the dispersed beam, outputting a reversed dispersed beam; and
    a second volume Bragg grating for receiving the reversed dispersed beam and outputting a recombined beam.

13. The butterfly tunable filter of claim 12, further comprising a blocker for blocking the $0^{th}$ order of the dispersed beam.

14. The butterfly tunable filter of claim 12, further comprising focusing optics positioned to receive the recombined beam.

15. The butterfly tunable filter of claim 12, wherein the volume Bragg gratings are made from a group consisting of: diochromated gelatin, holographic doped class, and holographic polymer.

16. A method for imaging using a butterfly filter over a optical band comprising acts of:
    setting a first volume Bragg grating;
    setting a mirror at a first position relative to the first grating; and
    setting a second volume Bragg grating and first position relative to the mirror,
    wherein a beam is dispersed by the first volume Bragg grating, reflected by the mirror, and recombined by the second volume Bragg grating.

17. The method of imaging of claim 16, further comprising an act of tuning the butterfly filter, wherein the act of tuning comprises acts of:
    changing an angle of the first volume Bragg grating;
    changing the position of the mirror relative to the first volume Bragg grating; and
    changing an angle of the second volume Bragg grating relative to the mirror.

* * * * *